Nov. 14, 1967  H. C. PFAFF, JR., ET AL  3,353,017
LATCH ASSEMBLY FOR LOWERING DEVICE MECHANISM
Original Filed July 3, 1962

INVENTORS
H. C. PFAFF, JR.
F. G. SCHLOSSER
BY
ATTORNEY

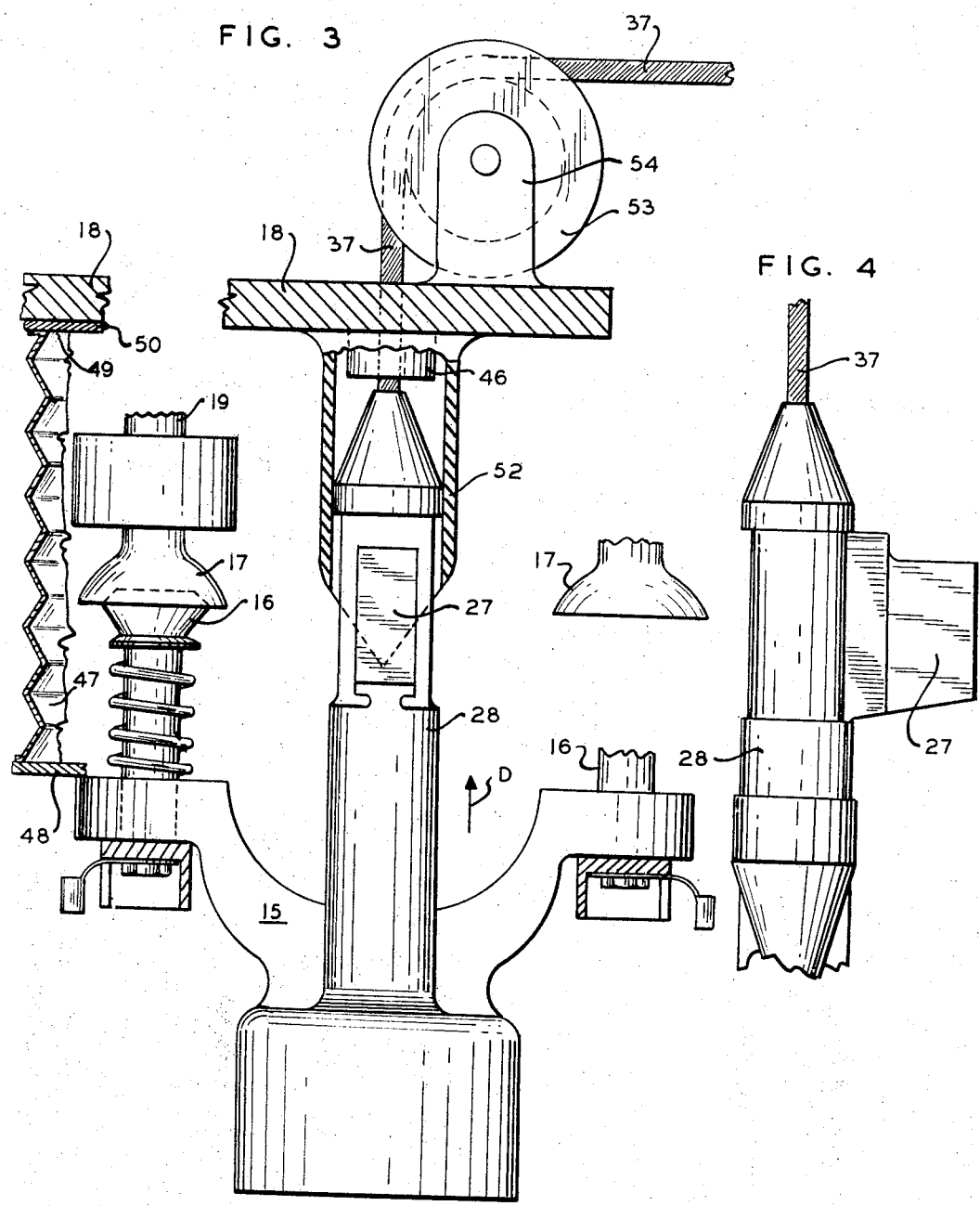

Nov. 14, 1967 H. C. PFAFF, JR., ETAL 3,353,017
LATCH ASSEMBLY FOR LOWERING DEVICE MECHANISM
Original Filed July 3, 1962 5 Sheets-Sheet 3

INVENTORS
H. C. PFAFF, JR.
F. G. SCHLOSSER
BY

ATTORNEY

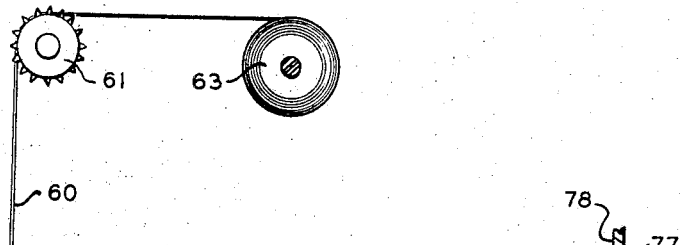
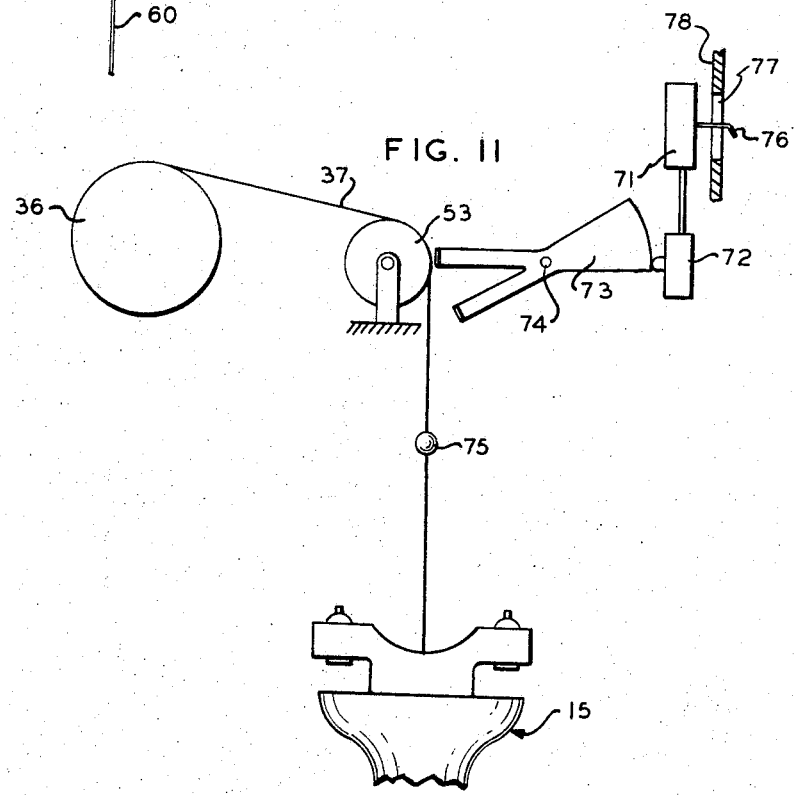
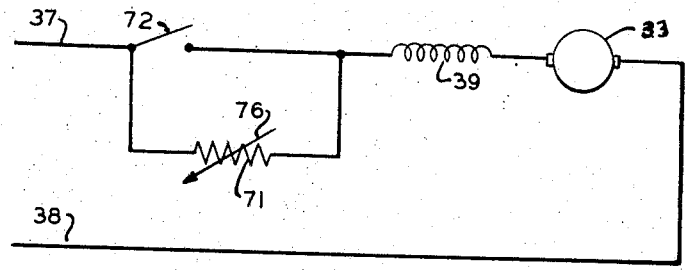

Nov. 14, 1967     H. C. PFAFF, JR., ET AL     3,353,017
LATCH ASSEMBLY FOR LOWERING DEVICE MECHANISM
Original Filed July 3, 1962     5 Sheets-Sheet 5

INVENTORS
H. C. PFAFF, JR.
F. G. SCHLOSSER
BY
ATTORNEY

United States Patent Office 3,353,017
Patented Nov. 14, 1967

3,353,017
LATCH ASSEMBLY FOR LOWERING
DEVICE MECHANISM
Henry C. Pfaff, Jr., Summit, and Francis G. Schlosser, Ridgefield Park, N.J., assignors to Pfaff and Kendall, Newark, N.J., a corporation of New Jersey
Continuation of application Ser. No. 207,196, July 3, 1962. This application Sept. 21, 1965, Ser. No. 488,915
10 Claims. (Cl. 240—66)

ABSTRACT OF THE DISCLOSURE

This invention relates to a lowering mechanism adapted for any desired indoor or outdoor use, including use in connection with a light carrying casing or luminaire, and having novel means for raising and lowering the latter relative to a fixed member having electrical contact members complementary to those carried by the casing. The casing may be lowered for example when the bulb needs replacement or for cleaning of the component parts.

This application is a continuation of our copending application, Ser. No. 207,196, filed July 3, 1962, now abandoned.

The invention incorporates novel means for the automatic latching connection of the casing to the fixed member and supporting the casing when the parts are moved to an elevated position by a motor whose circuit is opened, thus automatically cutting the motor off, when the casing has reached that position. To lower the casing, a button is momentarily pushed, releasing the latch mechanism; the casing is then lowered to the desired second position under control of the operator. The device assures effective and positive operation at all times.

Other features of the invention are the provision of means for automatically decelerating the rate of movement of the casing as it approaches the fixed member to assure smoother camming action without interfering with the rapid elevation of the casing prior thereto, and the provision of means for compensating for variations in weight of the casing.

The drawings, illustrating procedures and devices useful in carrying out the invention, and the description below, are exemplary only of the invention, which shall be deemed to cover all other devices and procedures coming within the scope and purview of the appended claims.

In the drawings, wherein similar reference characters indicate like parts:

FIG. 1 is a bottom plan view of the fixed member and associated parts embodying the invention, FIG. 2 is a schematic wiring diagram, exemplary of motor and solenoid control circuits which may be used in carrying out the invention, FIG. 3 is a fragmentary elevational partly sectional view of the fixed member, a pulley mounted thereon, and a cable entrained and secured at one end of the casing, which is dependent therefrom, FIG. 4 is a fragmentary side elevational view of the spindle end of the casing, FIG. 4a is a schematic view showing in full lines, the latch member and rod for automatically latching the casing in its upper position, FIG. 5 is a fragmentary elevational view, showing the casing elevated to its upper position and automatically latched by the latch member, FIG. 6 is a similar view showing the rod retracted clear of the latch allowing the latch to rotate clear of the spindle nosing due to the weight of the casing bearing on the latch.

FIG. 10 is a fragmentary side elevational view thereof, taken at line 10—10 of FIG. 8.

FIG. 11 is a schematic view of a mechanism for decelerating the casing in the last stage of movement thereof to latching position, and FIG. 12 is a wiring diagram of a circuit useful for the deceleration stage.

Figure 1:
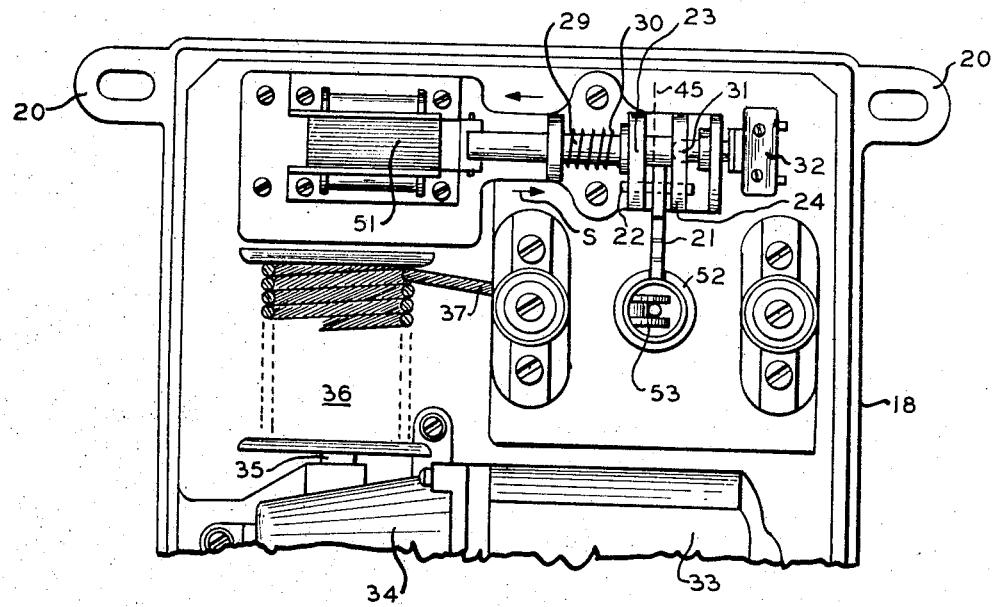

As shown in the drawings, the device of this invention comprises a casing 15 (FIG. 3) which preferably is provided with conventional illuminating bulbs and the required wiring and which is further provided with contact elements 16 mounted thereon for contact with complementary contact elements 17 secured to fixed member 18 as by any suitable means 19, fragmentarily shown so that when casing 15 is elevated to its upper position, said contact members 16–17 will engage and complete the circuit for electric lights or other devices carried by casing 15. The fixed member 18 may be (FIG. 1) secured as by bolts or the like passing through lugs 20 to a suitable support, such as a building, post standard or any other support in connection with which the invention is used.

Means are provided, as later described in detail, for automatically moving the casing 15 toward the fixed member 18 to engage the contact members 16, 17 and for discontinuing movement of said casing in said direction at that time. Means are also provided for automatically latching the casing in said uppermost position such that the weight of the casing is supported on a latch member actuated into latching engagement with the casing automatically and thereupon held in that position by registration means engaging the latch member and retractable from engagement with the latch member when it is desired to lower the casing. The lowering action is achieved on actuation of a switch means under control of the operator so that the casing may be lowered to precisely the desired point for service, repair or maintenance, and then returned to its upper position in an accurate and convenient fashion, and the parts will automatically be held in latched engagement on movement to said upper position.

Figure 2:
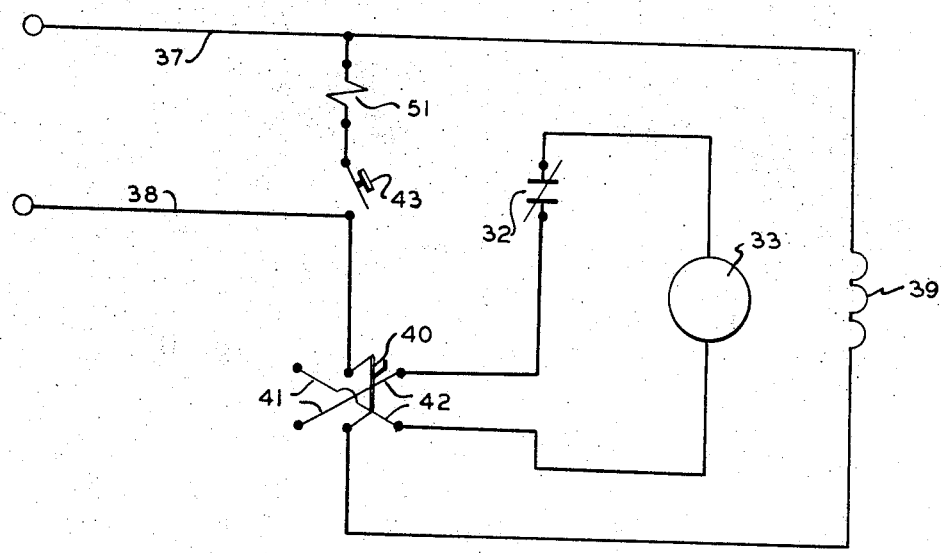
Figure 4A:
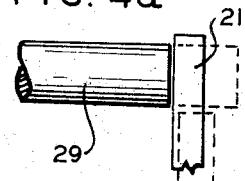
Figure 5:
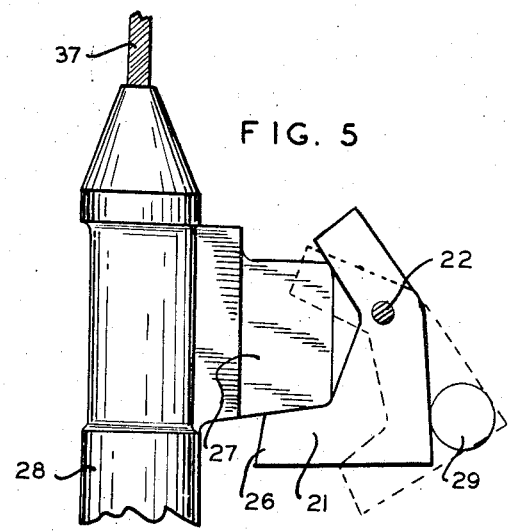
Figure 6:
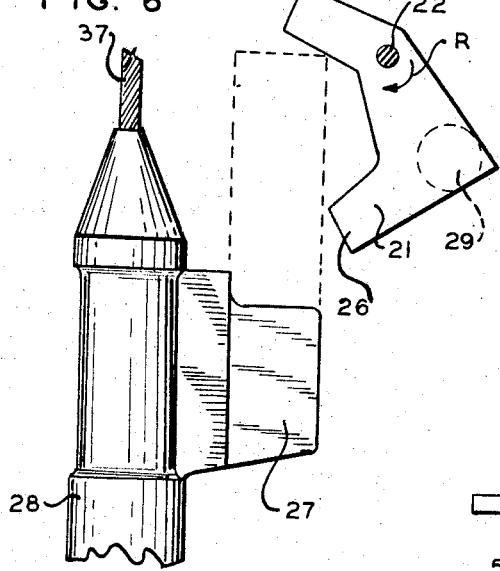

The means for holding the casing in its uppermost (FIG. 3) position, may include a latch member 21 (FIGS. 4a, 5, 6) pivoted as at 22 on a fixed part such as plate 18, for example, between (FIGS. 1 and 7) parallel spaced bearings or fingers 23, 24 on the plate 18 and provided with registered pivot pin openings 25 (FIG. 7) therein to receive the pivot pin 22 (FIG. 6). The latch member 21 is provided with a weighted, overbalanced L-shaped portion 26 so that the normal tendency thereof is to rotate in the direction R (FIG. 6) into registration with the underside of nosing 27 on spindle 28 of casing 15 (FIGS. 4 and 5). A finger portion F is also provided at the upper portion of member 21. Although the latch member 21 tends to rotate in direction R into registration with the underside of nosing 27, the weight of spindle 28 and casing 15 are such that the spindle nosing will rotate the latch member from FIG. 5 engaged to the FIG. 6 disengaged position in a direction reversed from direction R. This feature of the invention is utilized for automatic release of the latch member, for rotation out of engagement with nosing 27, as follows: An elongated rod 29 (FIGS. 1, 4a, 5, 6 and 7) is normally urged as by spring means 30 in the direction of arrow S (FIGS. 1 and 7) and into contact with a pin stud 31 which, when engaged by rod 29, thus opens switch 32 (which may be a normally closed switch (FIG. 2) closing the circuit through the motor 33) to stop the raising of casing 15. Reversible motor 33 (FIG. 1) through a gear box 34 or the like, rotates shaft 35 of drum 36 on which is entrained cable 37 secured to the spindle 28. Motor 33 derives its current from a suitable power source through current carrying wires such as 37', 38 having the series field 39 and toggle switch 40, which (viewing the parts as shown in FIG. 2) may be moved to the left to position 41 for lowering the casing 15 and associated parts or to the right to position 42 to elevate the same. If it is desired, for example, to elevate the casing 15 and associated parts, the switch 40, which may be a double pole, double throw toggle switch of any convenient form, is moved to the right in the position shown in FIG. 2 to close the circuit through the motor until such time as the switch 32 (which is a normally closed switch) is opened, at which time the circuit through the motor 33 will be opened and the motor thus shut off to stop elevation of the casing.

Pursuant to the invention, this operation of the switch 32 is achieved automatically at the moment when the casing 15 has been elevated to the desired position (FIG. 5) thus eliminating any chance of error which might be occasioned with considerable ensuing injury to the parts if the operator forgot to shut off the motor or did so too late. Release of the parts from their FIG. 5 latched position is achieved by the operator's moving switch 40 to the "lower" position 41 and then momentarily closing switch 43 (FIG. 2) which momentarily energizes the solenoid or other electrical mechanism 51 for retraction of the locking bar 29 away from the stud 31 of the switch 32 and clear of the plane 45 of rotation of the latch member 21 (FIG. 1). The latch member is thus freed of registration of the rod 29 edgewise (FIG. 5) thereagainst, the casing 15 and associated parts, on moving downwardly, rotate the latch member 21 to the position shown in FIG. 6. Retraction of the rod 29 by energizing the solenoid 51 is momentary, the operator then lifting his finger clear of the switch 43, de-energizing the solenoid; the locking bar presses against the side of the latch 21 (as shown in dotted lines in FIG. 6) holding the latch member in that position and free of switch 32 until the casing 21 and associated parts are next elevated to the FIG. 5 position whereupon the latch member is rotated by contact of nosing 27 with the finger portion F into registration with the underside of nosing 27 of the casing and the rod 29 moves against the edge of the latch member and automatically locks the same at the same time opening switch 32.

A stuffing box 46 (FIG. 3) may be provided through which the cable 37 passes and a bellows 47 enclosing the electric contact elements 16 of the casing 15 and extending upwardly therebeyond is secured to casing 15 as at 48 and may be provided with a top ring 49 adapted to make contact with the fixed member 18 or with a flexible ring 50 fixed thereto, thus isolating the contact elements 16, 17 from the atmosphere, enhancing the safety features of the device.

Figure 7:
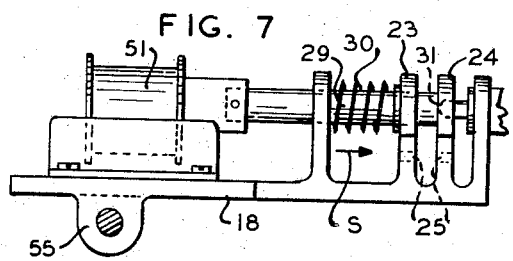
FIG. 7 is a side elevational view of the fixed member and parts mounted thereon including the solenoid slidably disposed in bearings, a switch member and the pivoted latch intermediate the elongated rod and switch member.
Figure 9:
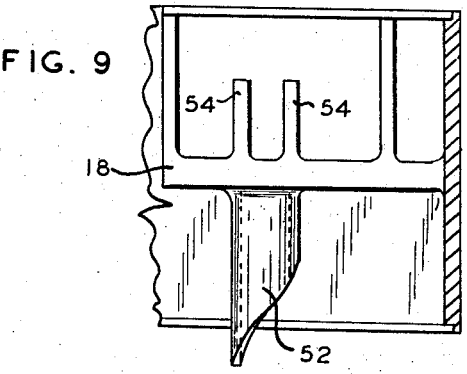
FIG. 9 is a fragmentary side elevational view of the fixed member and a cam secured thereto and depending downwardly therefrom for aligning the casing spindle nosing.

The fixed member 18 may be provided with aligning means 52, exemplarily shown in FIGS. 3, 9 and 1, having a cam slot engaged by nosing 27 and to assure correct registration thereof with the latch 21 automatically. The cable 37 may be entrained over a pulley 53 (FIG. 3) mounted on bearing 54 and the drum shaft 35 (FIG. 1) may be rotatably mounted in bearing 55 (FIG. 7).

Figure 8:
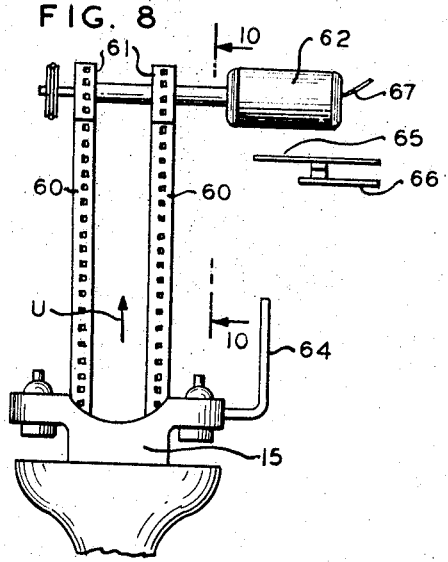
FIG. 8 is a schematic elevational view of a further form of the invention.

In the form shown in FIGS. 8 and 10 the casing 15 is carried by the flexible tape cables 60 over sprockets 61 driven by a motor 62, on to a take up reel 63 or the like (FIG. 10). In this form of invention, the casing 15 may have secured thereto an elongated spindle nosing 64 which may be in the form of a rod or the like extending therefrom and movable on elevation of the spindle 15 and associated parts in the direction of the arrow U (FIG. 8) upwardly until the nosing 64 strikes the arm 65 of a normally closed switch 66, whereupon said arm 64 opens the switch and thereby opens the circuit through the motor 62 and current for the further elevation of the casing 15 is automatically cut off. In this form of invention motor 62 may be a reversible motor with suitable controls for reversing the direction of rotation thereof. In the FIG. 8 form of the invention, the switch 66 may be visualized as comparable to the switch 32 of the wiring diagram circuit in FIG. 2. Motor 62 corresponds with the motor 33 at FIG. 2, toggle switch 40 may be provided to control the motor 62.

FIG. 11 schematically illustrates means for decelerating the rate of movement of the casing toward the fixed member at the last stage of elevation to latched position—for example, during the last few feet of travel, to facilitate smooth camming action without interfering with the rapid elevation of the casing for the major portion of its travel upwardly and its travel downwardly. The speed change is shown as accomplished by a voltage drop resistor—by introducing a resistance in series with the motor circuit. The value of the resistance to be introduced for proper speed reduction depends on the weight of the particular casing 15 being lifted. The circuit 37', 38 is wired by placing the resistance 71 in series with the motor circuit. In parallel with the resistance is a single pole, single throw switch 72. When the switch is closed, the resistance is short circuited and the motor travels at its normal high speed. When the switch is opened, all the current must pass through the resistance 71 and the motor travels at slow speed. The switch is opened and closed by a forked actuator 73 pivoted as at 74 to some fixed point and disposed in alignment with the pulley 53. The forked actuator 73 is triggered by a ball 75 placed on the cable 37 a short distance above the travelling half of the unit 15. The actuator 73 is placed so that it is triggered by the ball 75 in both upward and downward movement. When travelling upward, the switch 72 is opened, slowing the motor. In the lowering cycle, the switch 72 is closed by the ball 75, allowing the unit 15 to descend rapidly and (when desired) to rise rapidly until the ball 75 again actuates the switch 72. The resistor 71 may be a variable resistor; the resistance unit may be changed as by operating a lever 76 projecting through a slot 77 in a wall of the housing 78. The slot 77 of the housing may be calibrated in units of weight, so that the proper value resistance can be inserted at the job by untrained personnel, without the need of any conversion table or working knowledge of the unit.

Figure 13:
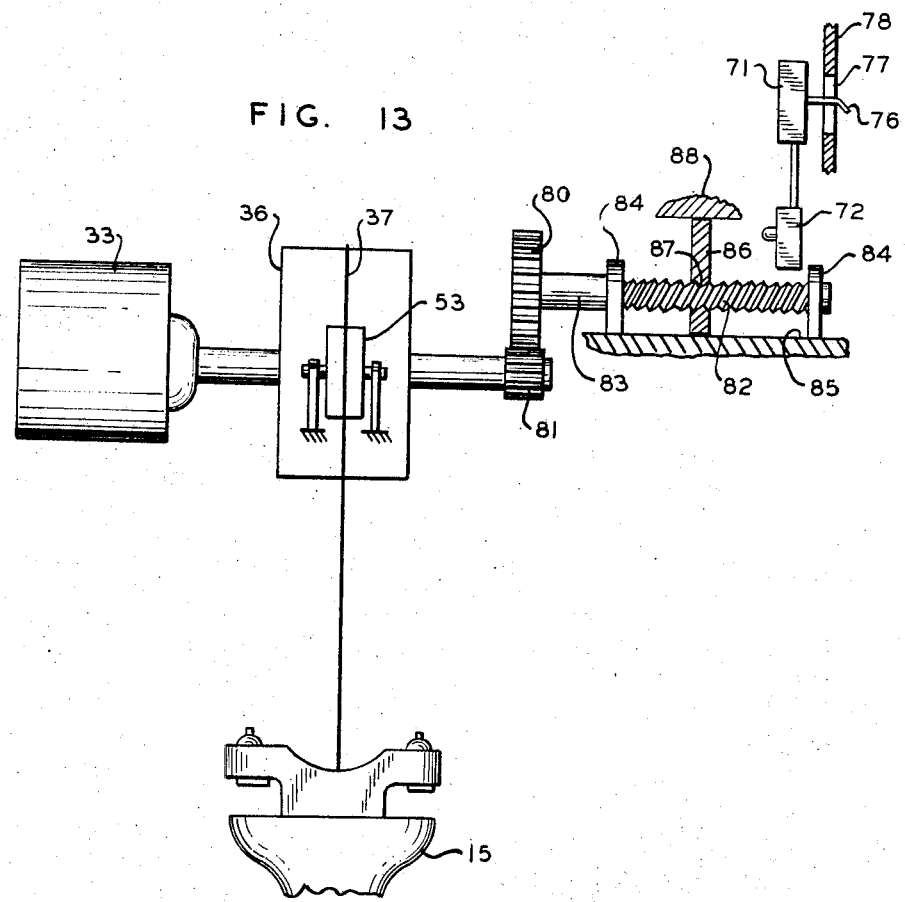
FIGURE 13 is a fragmentary elevational, partly sectional view of a motor driven switch actuator means.

Other means may be used to actuate switch 72 to reduce the speed of elevation of the casing 15 as it approaches the latch member 21. A further example thereof is shown in FIG. 13, wherein wheel 80 is shown positively or otherwise driven by the armature shaft of motor 33 as through pinion 81 fixed to said shaft and meshing with wheel 80 (which in such case may be a gear wheel). Screw 82, rotatably journalled in spaced bearings 84 fixed to a support having a flat upper surface 85, is fixed to the shaft 83 of gear wheel 80 and rotates with the latter; shaft 83 may be rotatably journalled in a suitable support or bearing (not shown). Slider bar 86 is internaly threaded as at 87 so as to be threadedly engaged by the screw 82 which in turn is rotated as above noted. Slider bar 86 is formed flat at the top and bottom thereof and abuts the spaced parallel flat surfaces 85, 88 of support member or plates 85, 88 so that rotation of the screw 82 will cause linear movement of the bar 86 toward switch 72 to actuate the latter on elevation of casing 15 above a predetermined point and disengage the switch 72 on lowering of the casing 15.

While the foregoing disclosure of exemplary embodiments is made in accordance with the Patent Statutes, it is to be understood that the invention is not limited thereto or thereby, the inventive scope being defined in the appended claims.

We claim:

1. A latch assembly for a lighting fixture, which fixture is raised and lowered by a motor unit positioned on a support, said assembly including a switch for activating said motor when said switch is engaged and operated by a member, a latch member, pivotally mounted on said support in position to be engaged and moved by said fixture at a predetermined position of the fixture, said latch member being an obstructing member to the movement of the switch operating member to prevent switch operation, said switch being operative by said switch operating member when the latch member does not obstruct the movement of the switch operating member.

2. In a latch assembly as set forth in claim 1, said pivotally mounted latch member being movable to an interposed position between said switch and said switch operating member.

3. In a latch assembly as set forth in claim 2, said switch operating member being an elongated rod slidably mounted on said support, and means engaging said rod, urging it toward the latch member and into engagement therewith.

4. In a latch assembly as set forth in claim 2, said switch operating member being an elongated rod slidably mounted on said support member, means coacting with said rod for moving said rod away from said switch and clear of said latch, thereby allowing said latch to move to a position between said rod and said switch, to thereby prevent said rod from returning to engaging position with said switch.

5. In a latch assembly as set forth in claim 2, said latch member having an "L" shaped portion so movable into interposed position between said switch and said rod.

6. In a latch assembly as set forth in claim 3, retraction means coacting with said rod for so moving said rod out of engagement with said latch.

7. In a latch assembly as set forth in claim 2, in which further means are provided for reducing the speed of elevation of the fixture as it moves into proximity to said predetermined position.

8. In the latch assembly as set forth in claim 7, said means for reducing the speed of elevation including a resistance unit.

9. In a latch assembly as set forth in claim 7, said latch member being engaged and moved by the fixture at a second position and thus controlling operation of said motor unit according to the position of the fixture.

10. In a latch assembly as set forth in claim 1, said means for engaging said switch including an elongated rod slidably mounted on said support, and means coacting with said rod for moving said rod clear of said latch, thereby allowing said latch to move to said not obstructing position.

References Cited
UNITED STATES PATENTS

| | | | |
|---|---|---|---|
| 1,306,484 | 6/1919 | Hunter | 318—418 |
| 2,609,170 | 9/1952 | Farrington et al. | 240—66 |
| 2,756,377 | 7/1956 | Litzman | 318—265 |
| 2,833,536 | 5/1958 | Joachim et al. | 49—280 |

NORTON ANSHER, *Primary Examiner.*

WYNDHAM M. FRYE, *Assistant Examiner.*